United States Patent [19]

Takahashi

[11] Patent Number: 4,808,016
[45] Date of Patent: Feb. 28, 1989

[54] OUTPUT APPARATUS WITH SUPPRESSION OF UNDERSCORING OF BLANK CHARACTERS

[75] Inventor: Tsutomu Takahashi, Kawasaki, Japan

[73] Assignee: Canon Kabushiki Kaisha, Tokyo, Japan

[21] Appl. No.: 833,559

[22] Filed: Feb. 27, 1986

[30] Foreign Application Priority Data

Mar. 5, 1985 [JP] Japan ................. 60-41885

[51] Int. Cl.⁴ ............................. B41J 29/26
[52] U.S. Cl. .......................... 400/17; 400/63; 400/83
[58] Field of Search ............ 400/16, 17, 18, 19, 400/20, 21, 22, 63, 83

[56] References Cited

U.S. PATENT DOCUMENTS

| | | | |
|---|---|---|---|
| 3,780,846 | 12/1973 | Kolpek et al. | 400/17 X |
| 3,912,065 | 10/1975 | Kashio | 400/17 |
| 4,084,680 | 4/1978 | Deetz | 400/17 |
| 4,323,315 | 4/1982 | Demonte et al. | 400/22 X |
| 4,381,553 | 4/1983 | Ferguson | 400/17 X |
| 4,558,965 | 12/1985 | Ueda | 400/144.2 |
| 4,615,631 | 10/1986 | Ueda | 400/705.1 |

FOREIGN PATENT DOCUMENTS

| | | | |
|---|---|---|---|
| 3411849 | 10/1985 | Fed. Rep. of Germany | 400/17 |
| 0185280 | 10/1983 | Japan | 400/17 |
| 0079786 | 5/1984 | Japan | 400/16 |
| 0044382 | 3/1985 | Japan | 400/17 |
| 0137678 | 7/1985 | Japan | 400/22 |
| 0143989 | 7/1985 | Japan | 400/22 |

OTHER PUBLICATIONS

IBM Technical Disclosure Bulletin, "Overprint Circuit", Tokunaga, vol. 26, No. 1, Jun. 1983, pp. 284–285.
IBM Technical Disclosure Bulletin, "Blank Character Control by Operator in the IBM 3270 Formatted Display", vol. 28, No. 6, Nov. 1985, pp. 2367–2368.

Primary Examiner—Ernest T. Wright, Jr.
Attorney, Agent, or Firm—Fitzpatrick, Cella, Harper & Scinto

[57] ABSTRACT

An output apparatus includes input apparatus for inputting at least space information and character information; a memory for storing output data corresponding to the input information to be output; an additional information memory for storing additional information, such as underline information, to be added to the output data; a distinction unit for determining whether or not the memory stores the output data when space data is input; and a unit for inhibiting a readout operation of the data output from the additional information memory when the distinction unit determines that the output data is not stored in the memory. The output apparatus further includes a readout unit for reading out the output data from the memory and reading out the additional information from the additional information memory as needed; and an output unit for carrying out an output operation based on the readout data, such that, for example, underline information is added only to space information positioned between information corresponding to two characters, and only a space positioned between two characters is underlined.

12 Claims, 5 Drawing Sheets

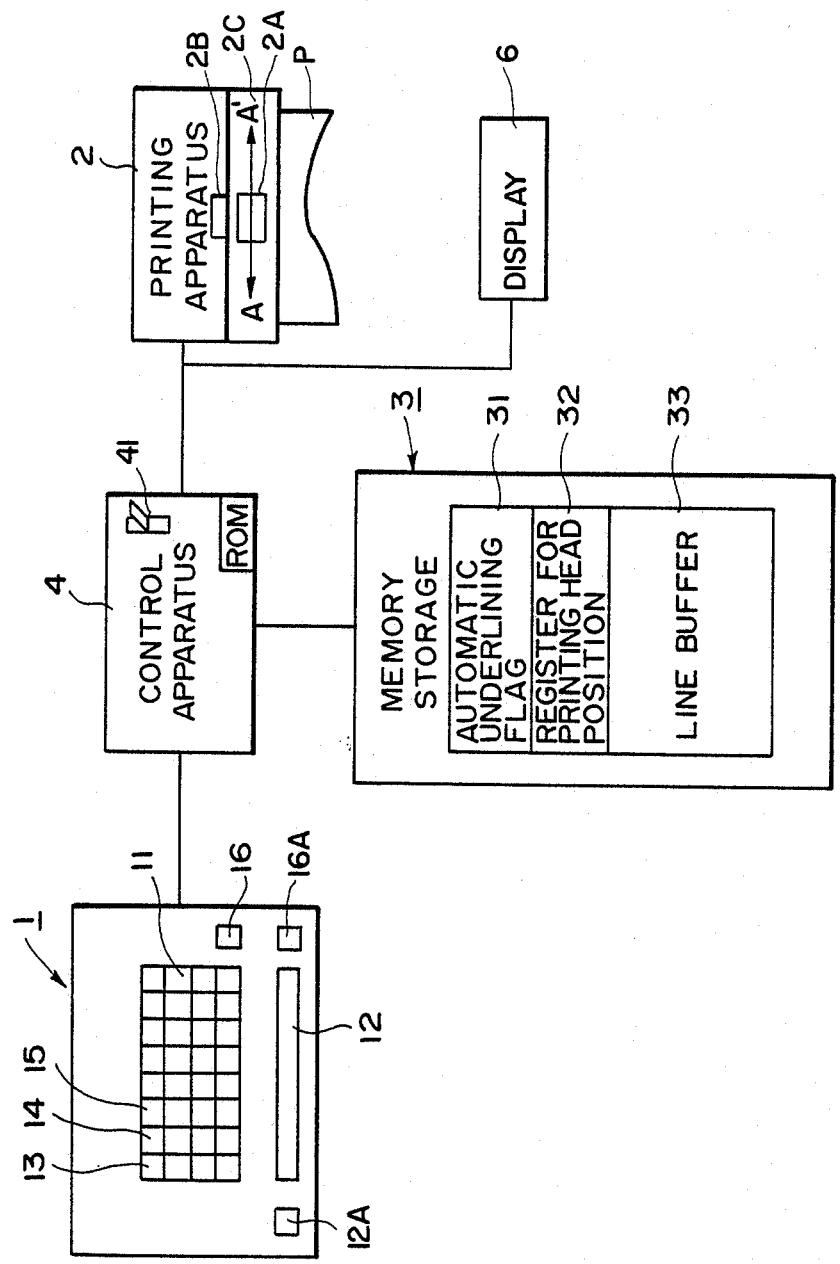
FIG. I

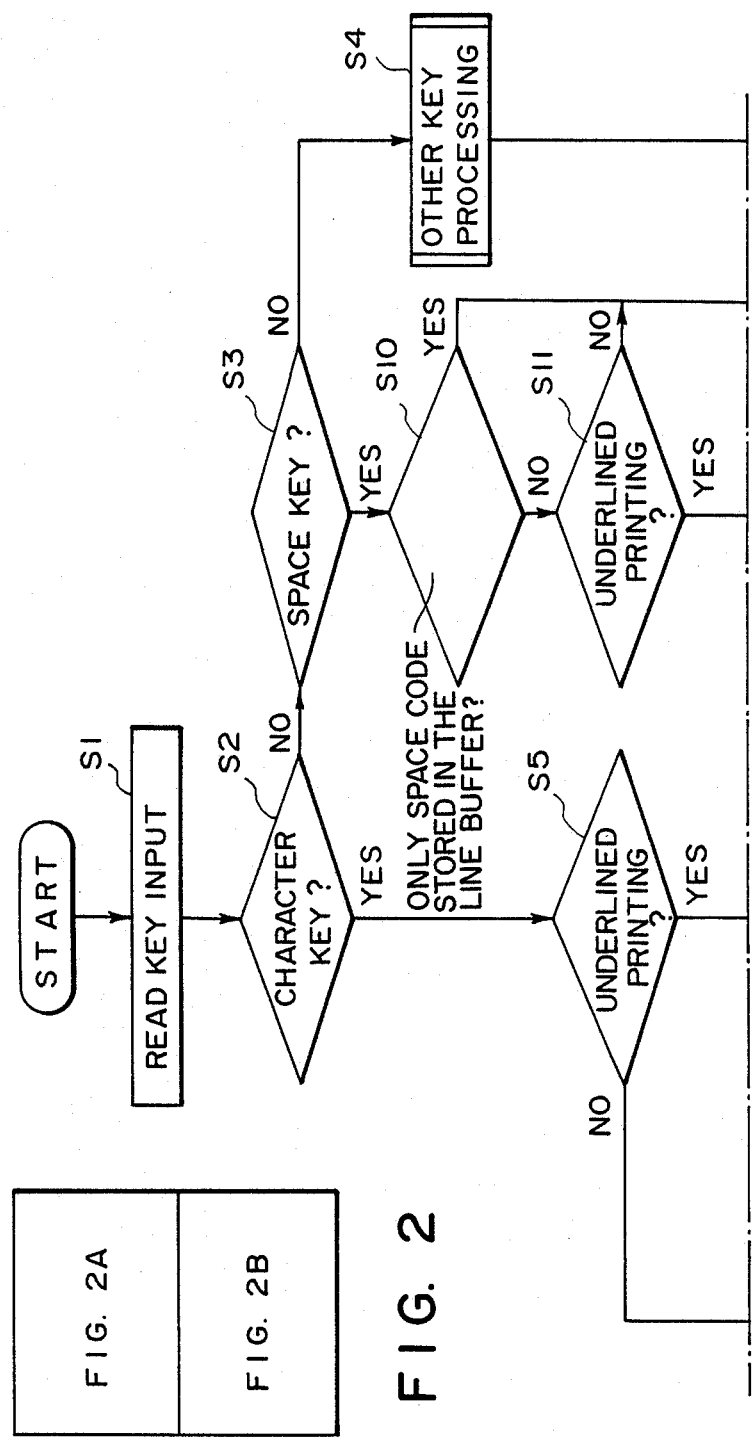

OUTPUT APPARATUS WITH SUPPRESSION OF UNDERSCORING OF BLANK CHARACTERS

BACKGROUND OF THE INVENTION

1. Field of the Invention

The present invention relates to an output apparatus suitable for an electronic typewriter or a wordprocessor and, more particularly, to an output apparatus with an underlining function.

2. Description of the Related Art

In conventional mechanical or electric typewriters, when an additional or ornamental character (e.g., an underline or upper line), more particularly, an underline is to be added to a character string to be printed, after printing the character string, a printing head is returned to a desired portion to be underlined, and the underline is superimposed thereon to obtain the underlined character string.

In recent years, a so-called electronic typewriter of an electronic control type using a microprocessor has been developed. In such an electronic typewriter, when an underline is added to a character string to be printed, an underlined character string can be automatically obtained upon use of an automatic underlining function without separately printing the character string and the underline.

In some conventional electronic typewriters with the automatic underlining function, a character and an underline are automatically printed at the same position upon depression of a desired character key. In others, when a return key is depressed, a character string, to which the underline is to be added, is underlined. In such an electronic typewriter, when the automatic underlining function is enabled, the underline is undesirably added to a space upon depression of a space key.

Such an automatic underlining function has an advantage in that even if a character string is constituted by a plurality of words, an underline can be continuously added to the overall character string. conversely, when the space key is depressed to move a printing head to set a margin or tab while the automatic underlining function is enabled, the underline is printed at an unnecessary portion.

For this reason, each time the printing head is moved, an operator must check if the automatic underlining functionis enabled, thus complicating a printing operation.

Not only a print output but also a display output has similar drawbacks. More specifically, when a cursor is moved to set a margin or tab, if the space key is depressed while the automatic underlining funtion is enabled, the underline is displayed undesirably.

SUMMARY OF THE INVENTION

The present invention has been made in consideration of the above situation and has as its object to provide an output apparatus which can easily move an output means to a predetermined position without cancelling an additional data adding function so as to improve operability.

It is another object of the present invention to provide an output apparatus in which in an underlined output mode, an underline is not printed until an initial character other than space data is output.

It is still another object of the present invention to provide an output apparatus in which even if an automatic underlining function is enabled, an output means is moved without outputting any character with respect to a space code input from a space key until initial character data in an output line is input, so that a margin, tab, or indent can be set without cancelling the automatic underlining function.

In order to achieve the above objects, there is provided an output apparatus comprising memory means for storing output data to be output; additional information memory means for storing additional information to be added to the output data; distinction means for determining whether or not the memory means stores the output data when space data is input; and means for inhibiting a readout operation of the output data from the additional information memory means when the distinction means determines that the output data is not stored in the memory means, the output apparatus further comprising: readout means for reading out the output data from the memory means and reading out the additional information from the additional information memory means as needed; and output means for carrying out an output operation based on the readout data.

BRIEF DESCRIPTION OF THE DRAWINGS

FIG. 1 is a block diagram of a system to which an output apparatus according to an embodiment of the present invention is applied to an electronic typewriter;

DETAILED DESCRIPTION OF THE PREFERRED EMBODIMENTS

Figure 2B:
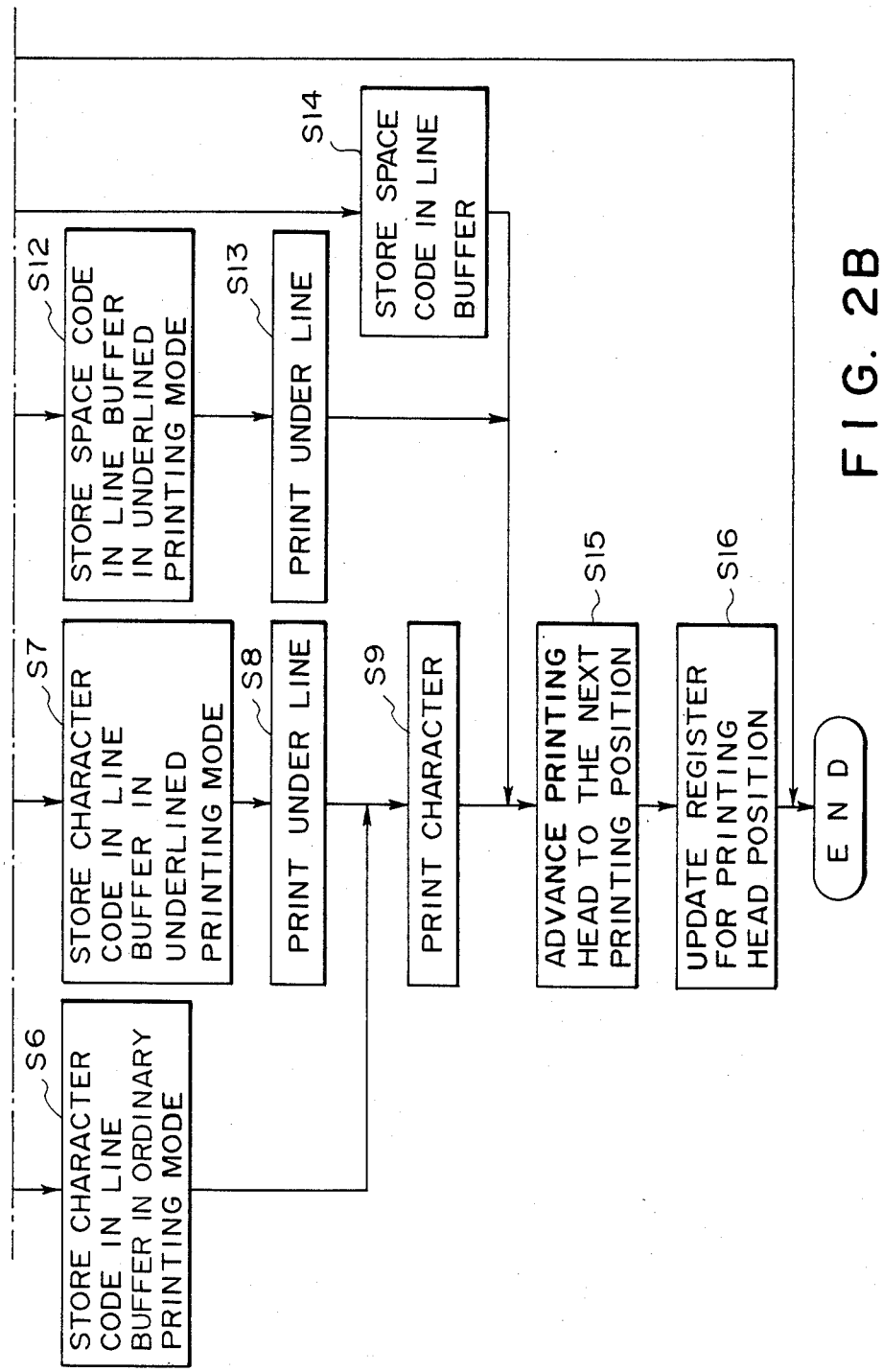
FIG. 2 illustrates the relative positions of FIGS. 2A and 2B, which together show a flow chart for explaining a processing sequence of the electronic typewriter shown in FIG. 1.

An embodiment of the present invention will now be described with reference to the accompanying drawings. Note that an output apparatus of the present invention can be a part (printing section or a display section) of a printing system or can be separately used. In a typewriter, the output apparatus of the present invention can be applied irrespective of a C/C mode, a W/W mode, or L/L mode (i.e. when an output operation is performed each time a character, a word, or a line is input).

Although the embodiment will be described with reference to a printer, the present invention is similarly applicable to display apparatuses such as a wordprocessor.

FIG. 1 shows a system configuration when a printer according to a present invention is applied to an electronic typewriter. A keyboard 1 as an input device comprises character keys 11 for inputting alphanumerical characters, a space key 12, a margin key 13, a tab key 14, an indent key 15, an instruction switch 16 for instructing an automatic underlining function, and the like. When an operator depresses the switch 16, he can underline a desired character or character string. Note that a switch 16A for designating an underlined output mode if a mode unique to the present invention is to be selected can be further added. A carriage-movement key 12A for moving a carriage 2C can be provided in addition to the space key 12.

A printing apparatus 2 reciprocates a printing head 2A in a horizontal direction (arrow A—A'), and can print on paper P a character corresponding to a key code input from the keyboard 1. A memory storage 3 includes an automatic underlining flag 31 indicating the presence/absence of the automatic underlining function, a position register 32 for storing a printing head position in the printing apparatus 2, a line buffer 33 for storing a character code corresponding to a key code input from the keyboard 1, and the like.

A control apparatus 4 comprises a microprocessor, which retrieves an input upon depression of keys 11-15 of the keyboard 1 or switching of the switch 41 thereof, and gives a print instruction for various print control to the printing apparatus 2 if the input is to be printed. The control apparatus 4 stores or reads out various data in or from the memory device 3, and makes various decisions to be described later. In addition, when the keyboard 1 instructs the automatic underlining function, the control apparatus 4 sets the automatic underlining flag 31 in the memory device 3, causes the position register 32 to store a current position of the printing head 2A on the printing apparatus 2, and stores printing character data input from the keyboard 1 in the line buffer 33 as a character code.

FIG. 2 shows the relative position of FIGS. 2A and 2B, which together illustrate a flow chart of a sequence (program) when the key 11 or 12 is depressed.

When any one of the keys 11-15 of the keyboard 1 is depressed, the control apparatus 4 retrieves the key input, and checks if a character key 11 is depressed (S1, S2).

If YES in step S2, the control apparatus 4 checks from the flag 31 if an underlined printing mode is selected (S5). The input character code and a printing mode identifier indicating whether or not automatic underlined printing is to be performed are stored in the line buffer 33 in accordance with the checking result from the control apparatus 4 (S6, S7). A storage technique of the printing mode identifier and the character code in the line buffer 33 is known to those skilled in the art, and a detailed description thereof is omitted.

If the underlined printing mode is detected in step S5, anunderline is first printed by the printing apparatus 2 under the control of the control apparatus 4 (S8). Subsequently, the character code stored in the line buffer 33 of the memory storage 3 is read out by the control apparatus 4 and is printed by the printing apparatus 2 (S9), and the printing head 2A is then moved to a position for printing a character corresponding to the next input character code by a moving means 2B (S15). Upon this movement, the control apparatus 4 updates the content of the position register 32 (S16).

Meanwhile, after step S1 as above, if NO is obtained in step S2, i.e., if the control apparatus 4 determines that a key other than a character key 11 is depressed, the control apparatus 4 checks if the depressed key is the space key 12 (S3). If NO in step S3, the flow advances to step S4 (i.e., other key processing). However, if YES in step S3, i.e., if it is determined that the space key 12 is depressed, the control apparatus 4 checks, based on the content of the line buffer 33, if the printing character code is to be stored in the current printing line (S10).

At this time, a key code other than a printing character code is input by the keyboard 1, the depression of the space key 12 is determined to simply move the carriage 2C, only a space code is stored in the line buffer 33 (S14), and the printing head 2A is moved to a position at which the next character is to be printed without printing any character (S15). Note that the space key 12 can alternatively be a carriage-movement (printing head) key 12A, as previously described.

If it is determined that a code other than a printing character code is input as above, the control apparatus 4 inhibits retrieval of the underlining flag 31, stores only the space code in the line buffer 33, and supplies only the space code to the printing apparatus 2. Thus, the printing head 2A of the printing apparatus 2 can be moved to the next printing position without printing any character.

Therefore, in the above operation, even if the automatic underlining function is instructed, underlined printing is not performed.

If NO in step S10, i.e., if it is determined that the printing character code has already been stored, the control apparatus 4 checks from the flag 31 if the underlined printing mode is designated (S11). If YES in step S11, i.e., if the underlined printing mode is designated, the control apparatus 4 stores an underlined printing mode identifier and the space code in the line buffer 33 (S12). The printing apparatus 2 prints only the underline based on the stored data (S13), the printing head 2A is moved to the next printing position (S15), and the same operation in step S16 as above is then executed.

If it is determined in step S11 that the underlined printing mode is not designated, only the space code is stored in the line buffer 33 (S14), and the printing head 2A is moved to the next printing position without printing any character.

Therefore, after at least one character is printed on the printing line, it is determined from the presence/absence of the designation of the automatic underlining mode whether or not the subsequent space data input by the space key 12 is to be underlined.

Figure 3:
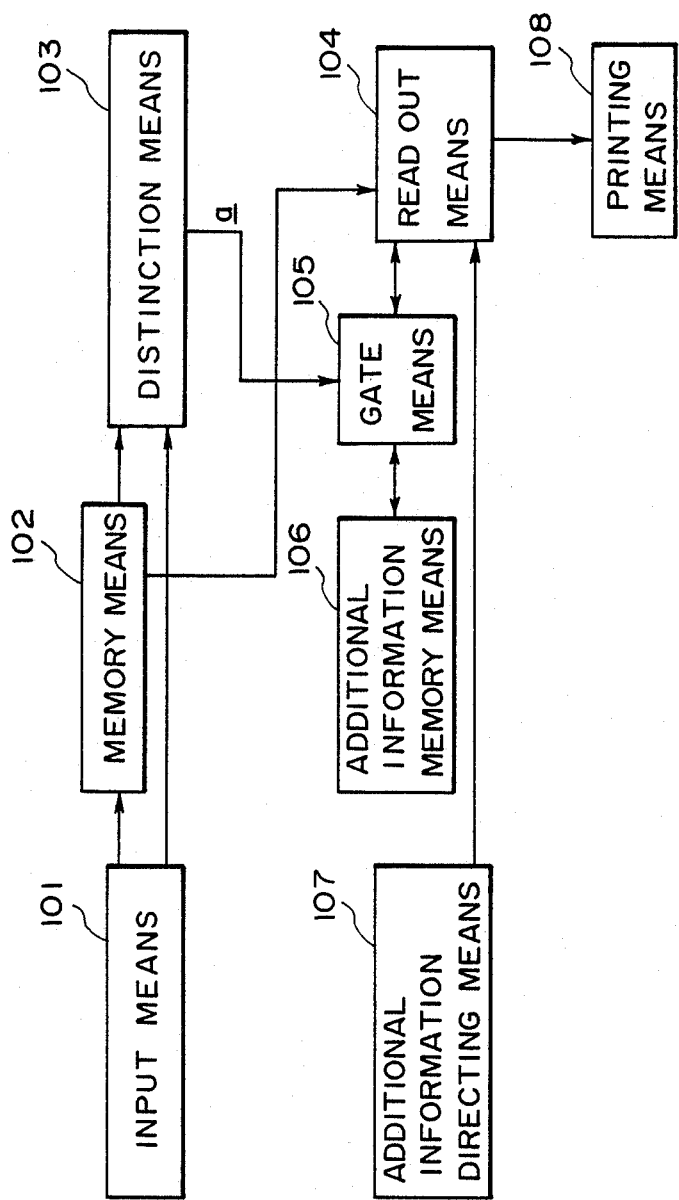
FIG. 3 is a block diagram showing a data flow of a printer of the present invention shown in Figs. 1 and 2.

FIG. 3 shows a detailed data flow in the above embodiment. When an input means 101 receives a key input, a distinction means 103 checks if a space code is input. If it is detected that the space code is input, it is checked if printing data (e.g., a character code) input from the input means 101 is stored in a memory means 102 for storing the printing data. If it is determined that the memory means 102 stores no printing data, the distinction means 103 supplies a distinction signal a to a gate means 105 so as to inhibit a readout operation from an additional information memory means 106. At this time, even if an additional information directing means 107 supplies an instruction for reading out additional information from the memory means 106 to a readout means 104, the readout means 104 cannot read out the additional information from the memory means 106 because of inhibition of the gate means 105. Therefore, the readout means 104 reads out the space data and supplies it to a printing means 108. The printing means 108 moves a printing head 2A to a next given printing position corresponding to the space data without printing any character on paper P.

When no distinction signal a is generated from the distinction means 103, a normal printer operation is enabled, and the gate means 105 releases its inhibition. Therefore, the readout means 104 can read out the additional information from the additional information memory means 106 in accordance with the instruction from the additional information directing means 107. The readout means 104 supplies to the printing means 108 data read out from the memory means 102 together with the additional information. The printing means 108 performs the printing operation in accordance with the supplied data.

Figure 4A:
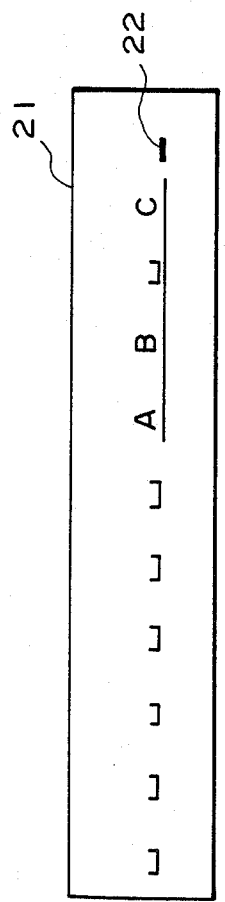
FIGS. 4(A) and 4(B) are illustrations comparing a display state of a display section of the present invention and that of a conventional apparatus, respectively.
Figure 4B:
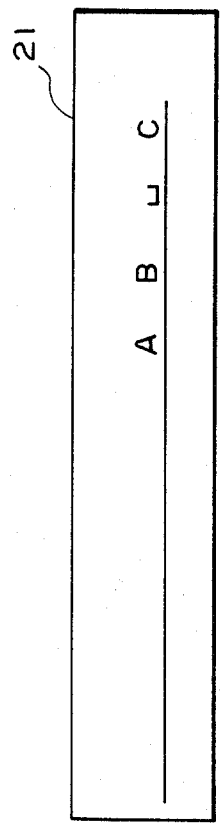

FIG. 4A shows an example of actual outputs (displays) of the apparatus of the present invention. Note that a display portion 21 is equivalent to the printing apparatus 2, and a cursor 22 is displayed on the display portion 21. If a display output shown in FIG. 4(A) is to be obtained, a conventional apparatus displays as shown in FIG. 4(B). More specifically, in the conventional apparatus, when the cursor 22 is moved to a position corresponding to a character A from the left end of the display portion 21, an underline is also displayed in correspondence with six "spaces", resulting in a poor display state. Conversely, the apparatus of the present invention displays as shown in FIG. 4(A). More specifically, spaces input for moving the cursor 22 are not underlined, and only those between characters are underlined. Therefore, an unnecessary underline is not displayed, and operability is improved significantly.

As described above, an apparatus of the present invention comprises memory means 102 for storing output data to be output; additional information memory means 106 for storing additional information to be added to the output data; distinction means 103 for determining whether or not said memory means 102 stores the output data when space data is input; and means 105 for inhibiting a readout operation of the output data from said additional information memory means 106 when said distinction means 103 determines that the output data is not stored in said memory means 102. According to the present invention, even if an automatic underlining mode is selected by an automatic underlining key 16, an operator can cause a printing apparatus 2 to freely move a printing head 2A using a space key 12 without printing an underline, until first character data to be printed onh a printing line is input. Therefore, a margin, tab, indent, or the like can be set without cancelling the automatic underlining mode.

In the above embodiment, a printing apparatus 2 has been exemplified as an output apparatus. However, the present invention is not limited to this and can be applied to various other output apparatuses (e.g., a display apparatus 6). In addition, an automatic underlining function has been exemplified as a specific function, but the specific function can be any other function.

Meanwhile, when no additional information is to be added, an output apparatus can be arranged such that a printing portion 21 moves a carriage 2C and at the same time, a display portion moves a cursor 22. Alternatively, in such a case, the output apparatus can be arranged such that only the printing portion moves the carriage without moving the cursor 22 on the display portion 21.

What is claimed is:
1. An output apparatus comprising:
input means for inputting at least space information and character information;
memory means for storing said space information and said character information input by said input means;
output means, responsive to said space information and said character information stored in said memory means, for outputting a space and a character, respectively, for each said space information and said charcter information stored in said memory means;
directing means for directing that an underline should be added to each said space and said character output by said output means; and
control means for controlling said output means such that even if said directing means directs that an underline should be added to each said space and said character, said underline is not added to a space positioned prior to a said character that begins a sentence despite said direction by said directing means that an underline should be added to each said space.

2. An output apparatus according to claim 1, further comprising underline memory means for storing underline-addition information directing that an underline should be added to each said space and character to be output, wherein said control means controls said directing means such that, when said directing means directs the addition of an underline, said underline-addition information is added to each said character information from said memory means and only to each said space information corresponding to a space positioned between two said characters, and wherein said output means adds an underline to each said space and character in response to said underline-addition information.

3. An output apparatus according to claim 1, wherein said output means includes a printer.

4. An output apparatus according to claim 1, wherein said memory means includes a one-line buffer memory.

5. An output apparatus to claim 1, wherein said output means includes a display apparatus.

6. An output apparatus comprising:
input means for inputting at least space information and character information;
memory means for storing said space information and said character information input by said input means;
output means, responsive to said space information and said character information stored in said memory means, for outputting a space and a character, respectively, for each said space information and said character information stored in said memory means;
identification means for identifying information newly input to said memory means by said input means, and for designating whether said newly stored information is space information or character information;
directing means for directing that an underline should be added to each said space and said character output by said output means; and
control means for controlling said output means such that when said directing means directs that said underline should be added to each said space and said character, and when said identification means identifies said information stored in said memory means and designates that only space information is stored in said memory means, said output means outputs each said space without adding said underline for said space information newly input by said input means.

7. An output apparatus according to claim 6, further comprising underline memory means for storing underline-addition information directing that an underline be added to each said space or said character to be output, wherein said control means controls said directing means such that, when said directing means directs the addition of said underline and when said identification means designates that only space information is stored in said memory means, said space information newly input by said input means is output to said output means without adding said underline-addition information stored in said underline memory means thereto.

8. An output apparatus according to claim 6, wherein said output means includes a printer.

9. An output apparatus according to claim 6, wherein said memory means includes a one-line buffer memory.

10. An output apparatus according to claim 6, wherein said output means includes a display apparatus.

11. An output apparatus comprising:
input means for inputting at least space information and character information;
movable printing means for mounting a printing head thereon, said printing head printing a character in response to each said character information input by said input means;
directing means for directing that an underline should be added to each said character to be printed; and
control means for controlling said printing means such that, when said directing means directs that said underline should be added to each said character to be printed, said printing means is moved without printing by said printing head in response to input of said space information until said input means inputs a first character information.

12. An output apparatus according to claim 11, further comprising a one-line buffer memory for storing said space information and said character information input by said input means.

* * * * *

UNITED STATES PATENT AND TRADEMARK OFFICE
CERTIFICATE OF CORRECTION

PATENT NO. : 4,808,016
DATED : February 28, 1989
INVENTOR(S) : Tsutomu Takahashi It is certified that error appears in the above-identified patent and that said Letters Patent is hereby corrected as shown below:

COLUMN 1
    Line 40, change "conversely," to --Conversely,--.
    Line 47, change "functionis" to --function is--.

COLUMN 3
    Line 46, change "anunderline" to --an underline--.

COLUMN 5
    Line 38, change "onh" to --on--.

Signed and Sealed this

Thirteenth Day of March, 1990

Attest:

JEFFREY M. SAMUELS

*Attesting Officer*     *Acting Commissioner of Patents and Trademarks*